P. M. FLACK.
AUTOMOBILE DIRECTION INDICATOR.
APPLICATION FILED MAR. 25, 1920.
1,369,413.
Patented Feb. 22, 1921.
8 SHEETS—SHEET 1.
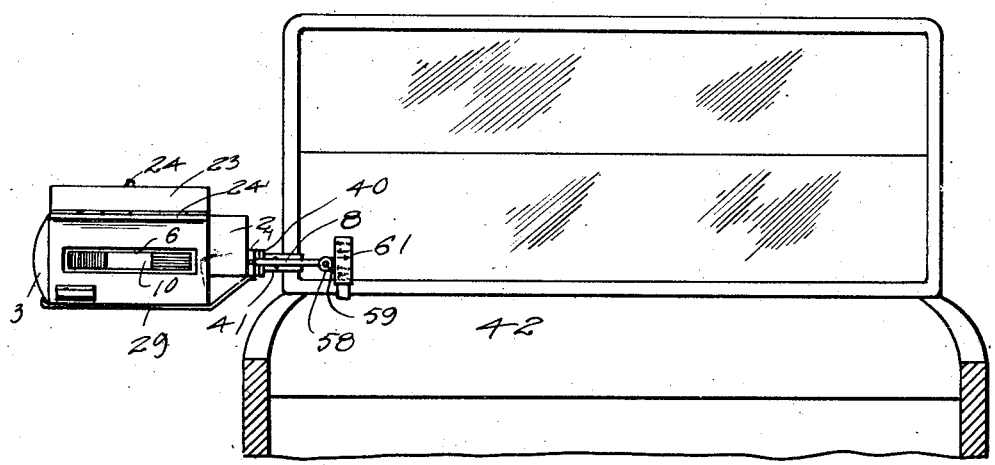
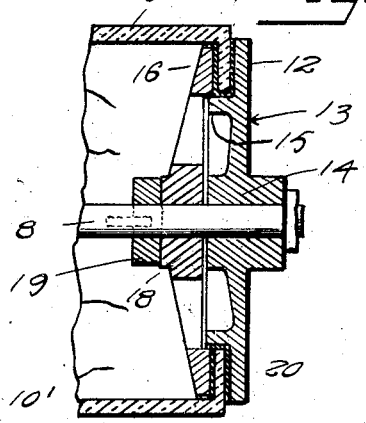
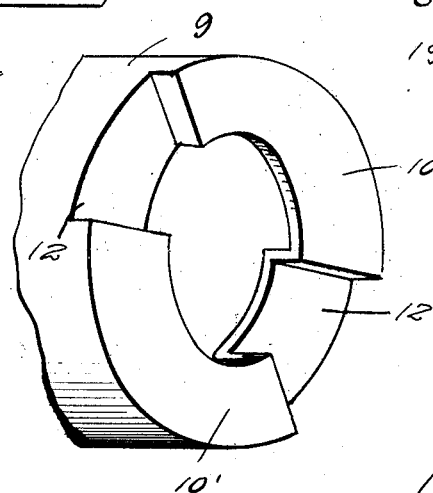
Inventor
P. M. Flack
By (signature) Atty

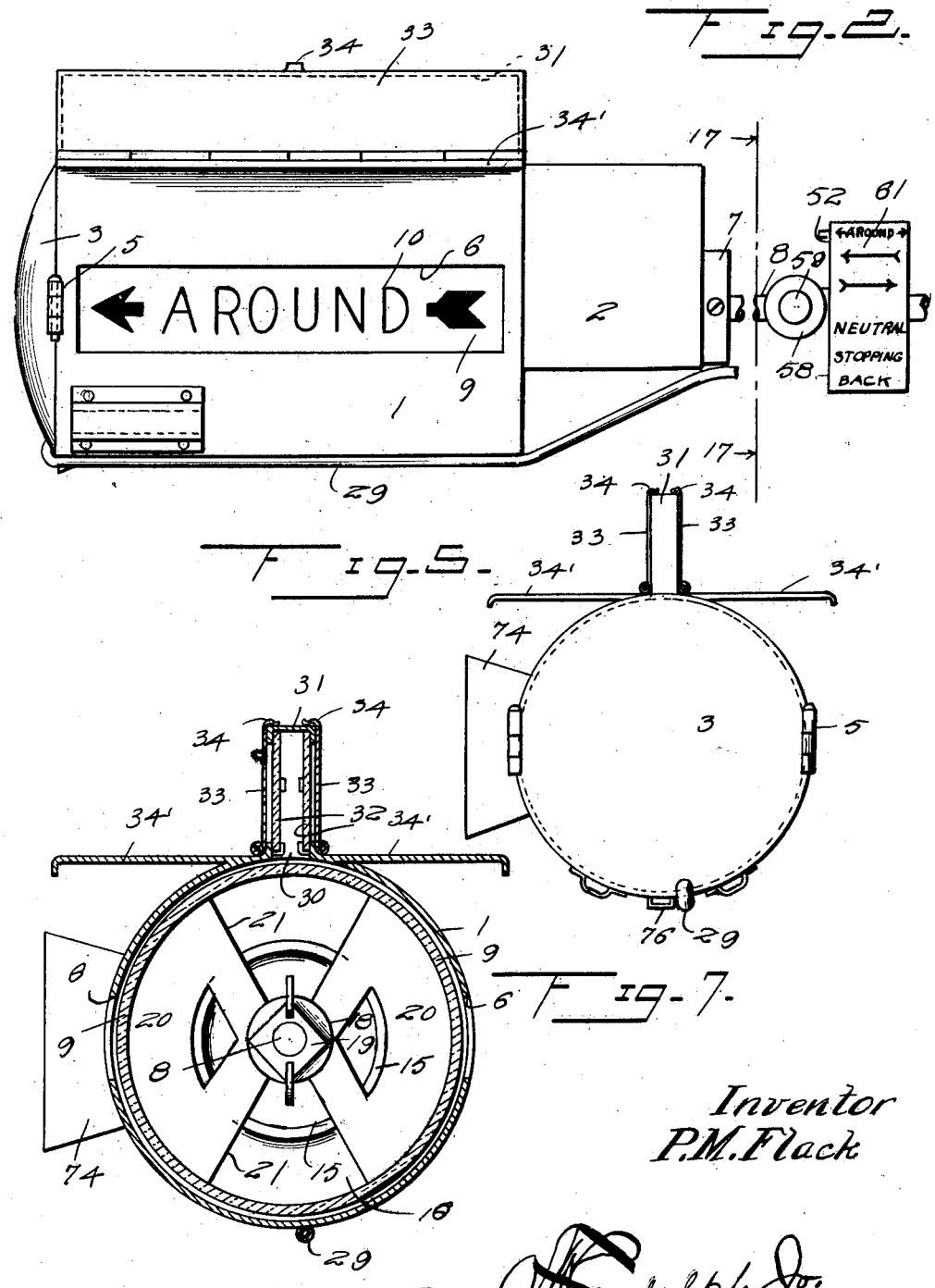

P. M. FLACK.
AUTOMOBILE DIRECTION INDICATOR.
APPLICATION FILED MAR. 25, 1920.
1,369,413.
Patented Feb. 22, 1921.
8 SHEETS—SHEET 3.
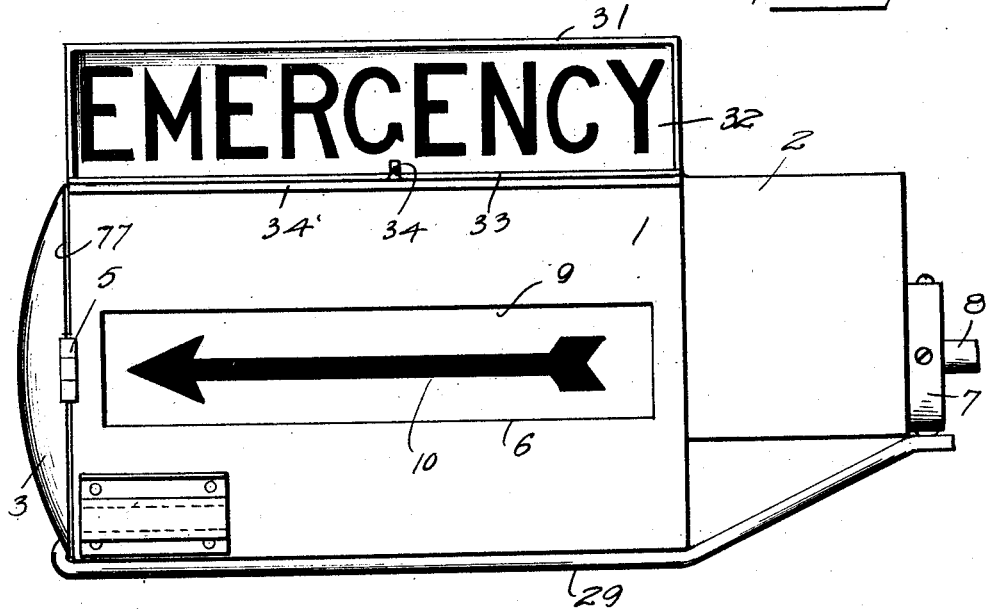
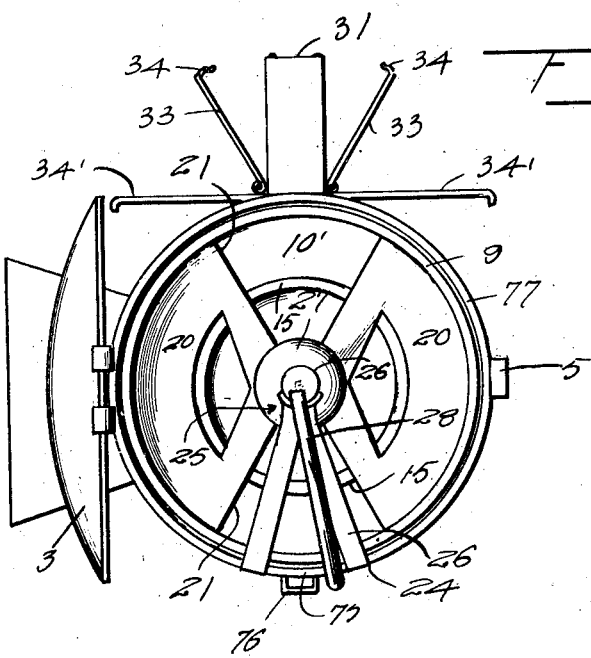
Inventor
P.M.Flack
By [signature] Atty

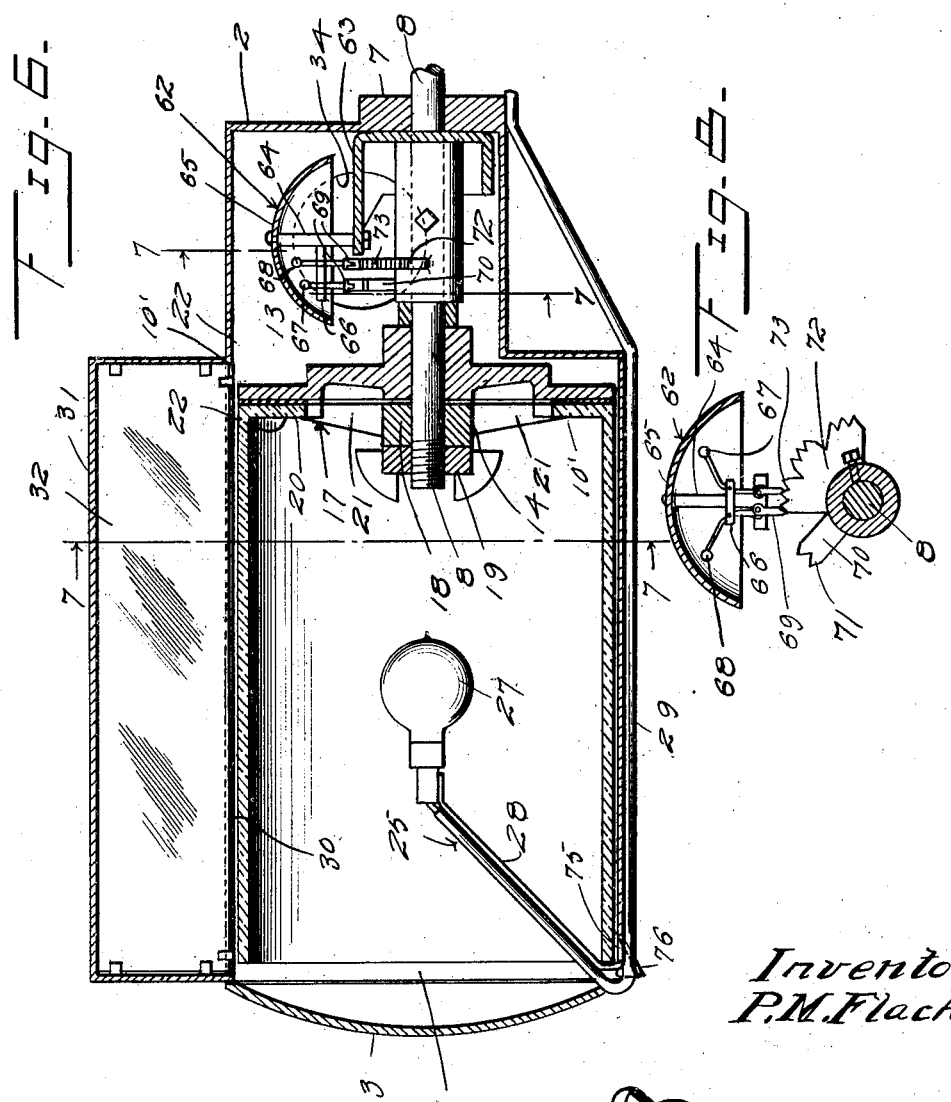

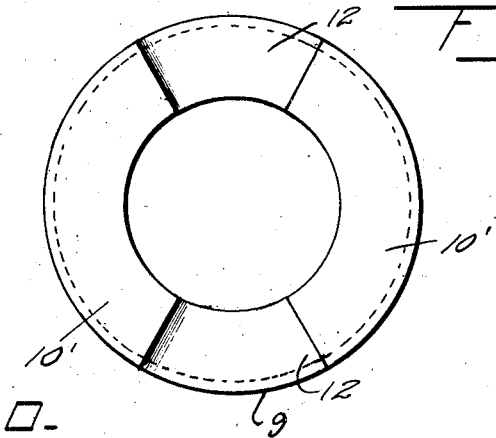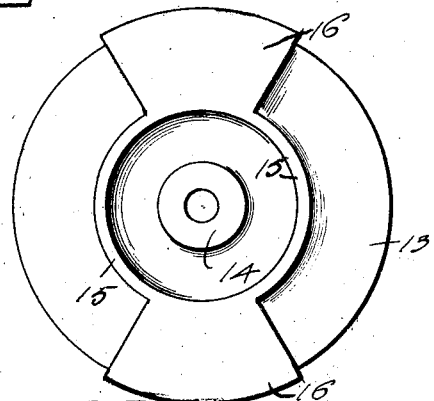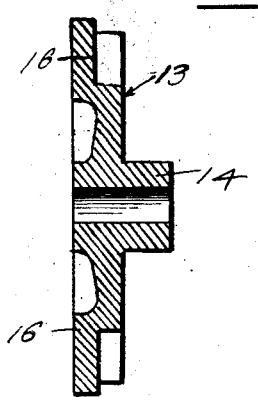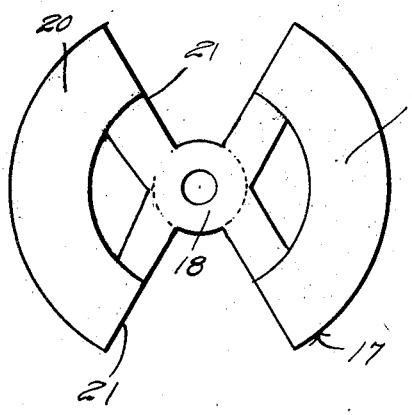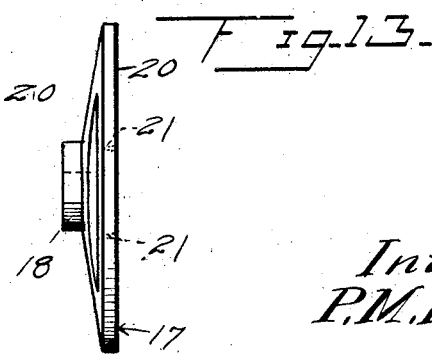

P. M. FLACK.
AUTOMOBILE DIRECTION INDICATOR.
APPLICATION FILED MAR. 25, 1920.
1,369,413.
Patented Feb. 22, 1921.
8 SHEETS—SHEET 6.
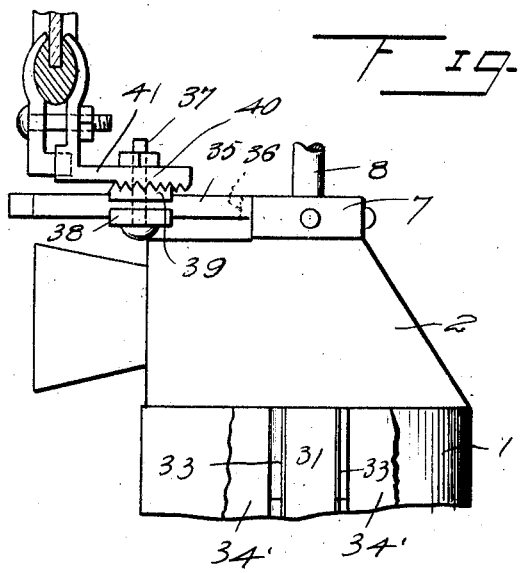
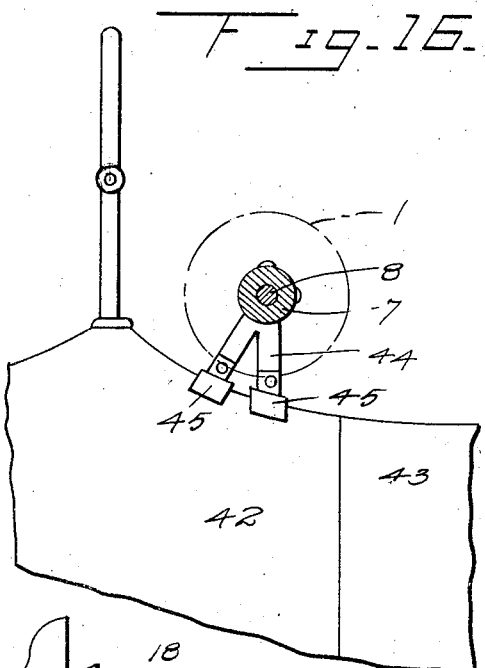
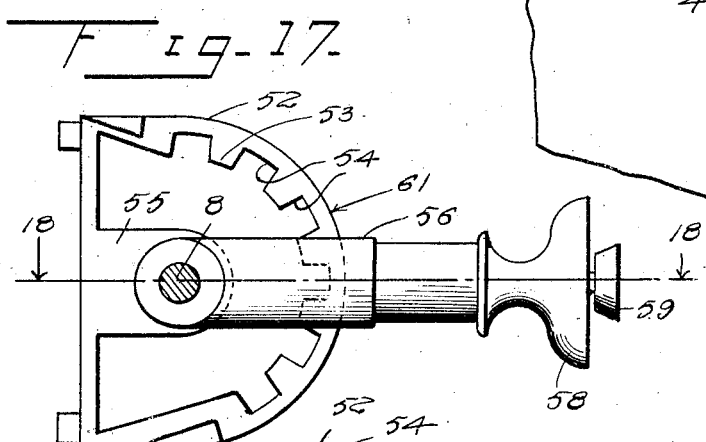
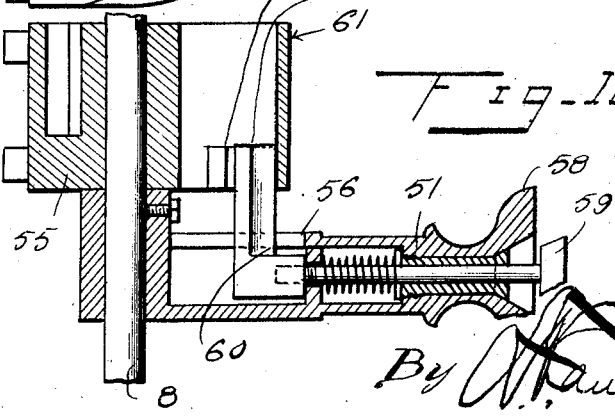
Inventor
P. M. Flack

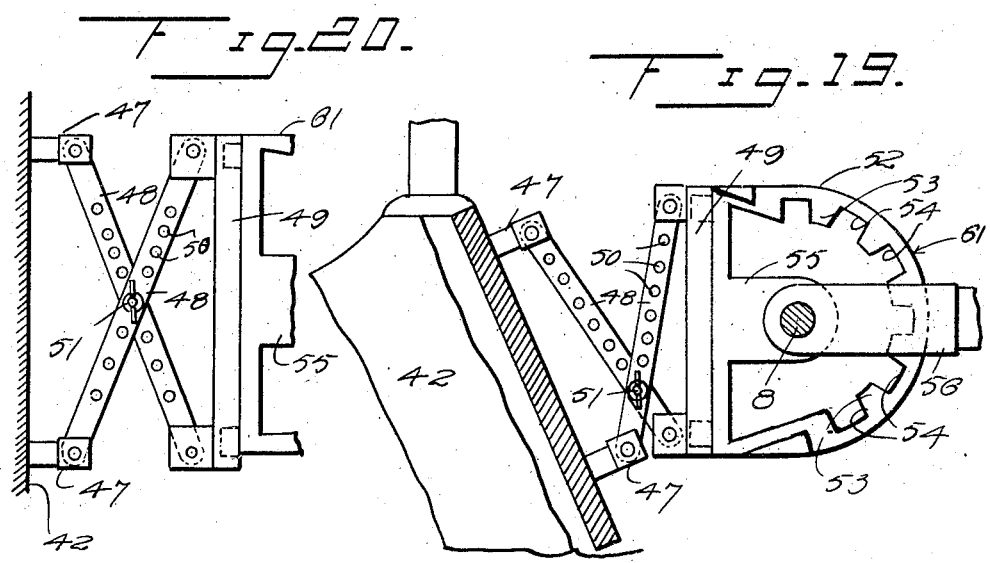
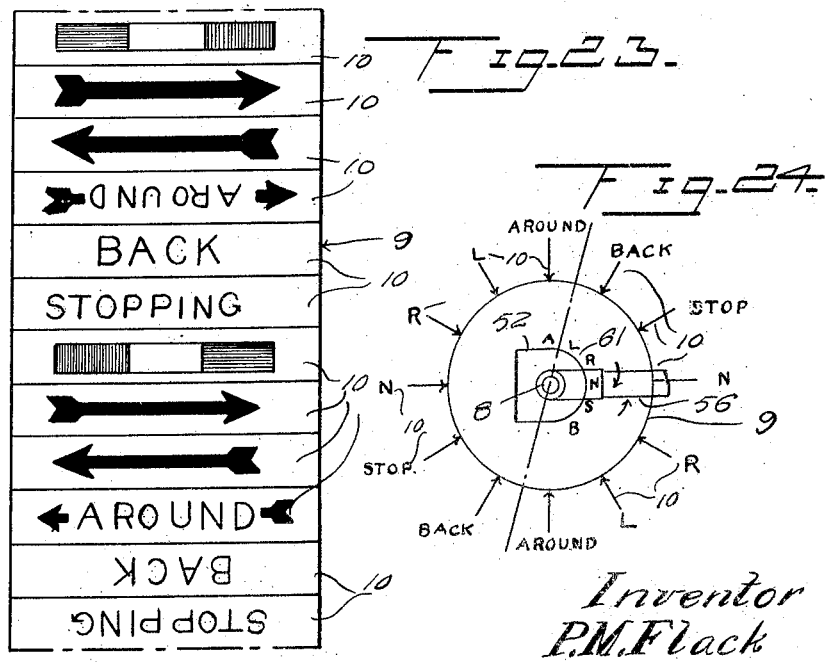

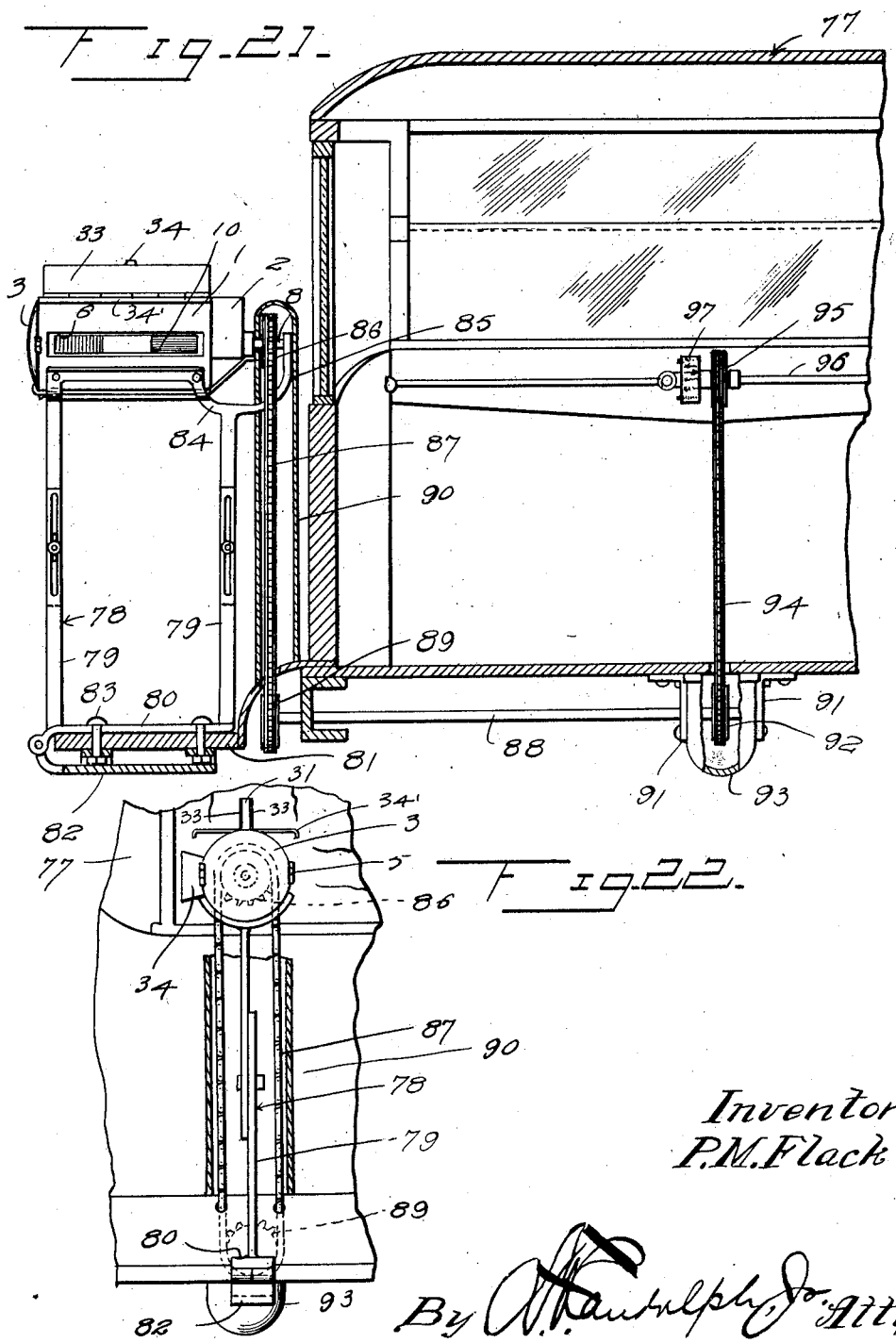

UNITED STATES PATENT OFFICE.

PAUL M. FLACK, OF OGDENSBURG, NEW YORK.

AUTOMOBILE DIRECTION-INDICATOR.

1,369,413.   Specification of Letters Patent.   Patented Feb. 22, 1921.

Application filed March 25, 1920. Serial No. 368,573.

*To all whom it may concern:*

Be it known that I, PAUL M. FLACK, a citizen of the United States, residing at Ogdensburg, in the county of St. Lawrence and State of New York, have invented certain new and useful Improvements in Automobile Direction-Indicators; and I do hereby declare the following to be a full, clear, and exact description of the invention, such as will enable others skilled in the art to which it appertains to make and use the same.

This invention relates to new and useful improvements in automobile direction indicators and has for its primary object the provision of a device which can be easily actuated to indicate to traffic both in front and rear of the respective automobile a change in the course or if a stop is contemplated.

Another object of this invention is the provision of an alarm to attract attention to the signals displayed and which alarm is adapted to vary in the number of times sounded for the various signals.

A further object of this invention is the provision of a casing having sight openings through which the signals are adapted to appear and which signals are carried by a drum controlled by means in convenient reach of the operator, thereby obviating the necessity of the operator placing a hand laterally of the automobile to give a signal to the traffic.

A further object of this invention is the provision of means whereby the device can be used in connection with either an open or closed automobile.

A still further object of this invention is the provision of an automobile direction indicator of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a rear elevation of an automobile signal constructed in accordance with my invention and illustrating it applied to an automobile, Fig. 2 is a side elevation, illustrating one of the signals in view, Fig. 3 is a side elevation, illustrating another signal in view and also an auxiliary signal, Fig. 4 is an end view illustrating the door to the casing in an open position, Fig. 5 is a similar view with the door in a closed position, Fig. 6 is an enlarged longitudinal sectional view illustrating the drum, alarm and the actuating means for said drum, Fig. 7 is a sectional view taken on the line 7—7 of Fig. 6, Fig. 8 is a transverse sectional view taken on the line 8—8 of Fig. 6, Fig. 9 is an end view of the drum, Fig. 10 is a plan view of an outer clamping plate, Fig. 11 is a sectional view of said clamping plate, Fig. 12 is a plan view of the inner clamping plate, Fig. 13 is an edge view of said inner clamping plate, Fig. 14 is a fragmentary perspective view of one end of the drum, Fig. 15 is a plan view of the clamp for attaching the casing to the automobile, Fig. 16 is an elevational view, illustrating a modified form of clamp, Fig. 17 is a sectional view taken on the line 17—17 of Fig. 2, Fig. 18 is a sectional view on the line 18—18 of Fig. 17, Fig. 19 is a plan view illustrating a supporting bracket for the operating device, Fig. 20 is a side elevation, illustrating the supporting bracket adjusted for a perpendicular dash of the automobile, Fig. 21 is a rear elevation partly in section, illustrating the device applied to a closed automobile, Fig. 22 is an end view of the casing supported by the modified form of bracket illustrated in Fig. 21, Fig. 23 is a diagrammatical view of the drum illustrating the signaling characters, Fig. 24 is a similar view illustrating the characters on the drum and board.

Fig. 25 is a fragmentary vertical sectional view illustrating the means of connecting the drum to the shaft.

Referring in detail to the drawings the numeral 1 indicates a tubular casing having one end closed by an end wall 2 while its other end is closed by a door 3 which is secured to the casing 1 by a hinge 4 and a catch 5. The front and rear of the casing 1 is provided with elongated sight openings 6 through which the various signaling characters are adapted to appear. The end wall 2 is provided with a bearing 7 which rotatably receives an operating shaft 8 that extends into the casing and has secured thereto a drum 9 preferably constructed from glass and of cylindrical formation. The drum 9 has seated or otherwise applied to its periphery a plurality of pairs of characters 10 and which are preferably of a dark or opaque color and the characters of each pair are arranged oppositely to each other so that when a certain character comes in view through the front sight opening 6, a corresponding character appears through the rear sight opening. The arrangement of the characters on the drum is clearly illustrated in Fig. 23. One signaling character is in the form of an arrow pointing to the left to indicate a turn in such a direction when said character is in view through the sight opening. Another character is in the form of an arrow pointing in an opposite direction indicating a turn to the right. Another character is in the form of the word "Around" with the head and tail of an arrow at each end to indicate that the operator of the automobile is going to turn said automobile around. Another character is in the form of the word "Stop" to indicate that the respective automobile is going to make a stop, while the other character is in the form of the word "Back" indicating that the respective automobile is going to move in a reverse direction. Blank spaces are provided on the drum to appear in the rear of the sight openings when the device is in a non-signaling position and if desired these blank spaces may be colored red, white and blue or the United States coat of arms may be applied in said spaces.

One end of the drum 9 has formed thereon an inwardly directed arcuate shaped flange 10' which has tapered indentations 12. An outer clamping plate 13 is provided with a hub portion 14 to receive the operating shaft and has formed thereon an annular flange 15 which is adapted to have the inner edges of the flange 10' of the drum 9 rest thereon. Tapering lugs 16 are formed upon the inner face of the outer clamping plate 13 and are received within the indentations 12 of the drum 9. An inner clamping plate 17 is provided with a hub 18 to receive the operating shaft 8 and is secured thereto in any well known manner and said hub 18 is adapted to abut the hub 14 of the outer clamping plate to prevent or limit the movement of said clamping plates in the direction of each other thereby obviating the danger of crushing or breaking the flange 10 on the drum 9. A wing nut 19 is turned onto the operating shaft 8 for holding the clamping plates on said shaft. The inner clamping plate 17 is provided with segmental portions 20 that are adapted to engage the inner face of the flange 10' of the drum 9 and have their ends spaced and disposed on an incline to define slots or spaces 21 with converging walls to receive the indentations 12, thus it will be seen that the drum which is constructed of fragile material is rigidly secured to the operating shaft and also that a construction is provided wherein the drum can be readily detached from the shaft when desired. Packing washers or strips 22 are adapted to be positioned between the flange 10 of the drum 9 and the clamping plates 13 and 17.

By rotation of the operating shaft 8 the various signaling characters will be brought into view through the front and rear sight openings of the casing 1. The casing 1 adjacent its open end is provided with spaced offset portions 24 in which attaching feet 25 of an electric lamp supporting bracket 25' are secured. The attaching feet 25 are formed on converging legs 26 of the bracket 25' and which legs extend upwardly and inwardly so as to dispose the electric lamp socket 26' carried by the lamp bracket 25' at a point midway of the ends of the drum 9, and the electric lamp socket 26' supports an electric lamp 27. One of the legs 26 and a portion of the bracket 25' is of a hollow formation to receive the electrical conductors 28 of the electric lamp 27 and which conductors extend through a tube 29 carried by the casing and located exteriorly thereof and in communication with one of the offset portions 24. The conductors 28 are adapted to be connected with any suitable electrical source carried by the automobile for the purpose of illuminating the lamp 27.

The top portion of the casing 1 is provided with a slot 30 closed by an auxiliary casing 31 which has its front and rear walls open and closed by transparent panels 32 on which are painted or otherwise applied characters spelling the word "Emergency." The auxiliary casing 31 and the characters carried thereby are illuminated from the rays of light in the main casing 1 by way of the slot 30. Doors 33 are hinged to the auxiliary casing 31 and are provided with spring catches 34 for the purpose of securing them in a closed position to conceal the characters carried by said auxiliary casing when the automobile is not being used in an emergency cause. A horizontally disposed hood 34' is formed on the upper portion of the casing 1 and projects forwardly and rearwardly of the auxiliary casing 31 and also overlies the front and rear sight openings to protect them from rain and the like, and said hood is also adapted to form a support for the doors 33 when in open positions.

A supporting arm 35 is formed on the closed end of the casing 1 and is provided with an elongated slot 36 to receive a clamping bolt 37 on which are mounted clamping plates 38 that frictionally engage the front and rear faces of said arm 35 and one of said plates 38 is provided with teeth 39 to be engaged by teeth 40 formed on a clamp 41. The clamp 41 is adapted to be adjusted in relation to the supporting arm 35 and is adapted to be applied to the upright of a wind-shield or other convenient part on the automobile 42.

To apply the casing 1 directly to the body 43 of the automobile instead of the wind-shield, a pair of diverging legs 44 are formed upon the closed end of the casing and are each provided with a clamp 45 that engages the edge of the body 43 and is secured thereto in any well known manner.

An adjustable supporting bracket 46 is secured to the instrument board or dash of the automobile and consists of a pair of attaching members 47 that are bolted or otherwise secured to the automobile and to which are pivoted arms 48.

The arms 48 intercross each other and have their other ends pivoted to a movable or adjustable base 49 and said arms 48 are provided with a series of openings 50 to receive a bolt 51 whereby the angle of the base 49 can be varied by adjusting the arms 48 in relation to each other. A segmental rack 52 is carried by the base 49 and has a series of teeth 53 formed thereon which define notches 54. A bearing 55 is carried by the segmental rack 52 and rotatably receives the inner end of the operating shaft 8, the outer end of the operating shaft being journaled in the wall of the automobile body or if desired the clamp that attaches the casing to the automobile can be depended upon to support the outer end of said operating shaft.

A controlling lever 56 is secured to the operating shaft 8 and is associated with the segmental rack 52 and has secured thereto a bushing 57 on which is mounted a finger grip 58 constructed of rubber or other material suitable for the purpose. A plunger 59 is slidably mounted within the bushing and projects beyond the finger grip 58 at one end while its other end is slidably mounted in the controlling lever 56 and carries a dog or pawl 60 adapted for engagement with the notches 54 to lock the controlling lever at various positions. A scale board 61 is carried by the base 49 and arranged adjacent the controlling lever and has coated or otherwise applied thereon characters corresponding to the characters on the drum 9. When the controlling lever 56 is moved to aline with a certain character on the board 61, the corresponding characters will move in view through the front and rear sight openings of the casing.

An alarm 62 is arranged within the closed end of the casing 1 and includes a supporting bracket 63 carrying a post 64 on which is mounted a bell 65. The post 64 carries an arm 66 to which is pivoted bell clappers 67 and 68. The bell clappers 67 and 68 have hinged thereto teeth engaging elements 69. A plate 70 is secured to the operating shaft 8 and has two teeth 71 formed thereon and on movement of the operating shaft 8 in one direction, the tooth engaging element 69 of the bell clapper 67 will be actuated twice sounding the bell a corresponding number of times indicating that the operator of the respective automobile is going to operate the same in a reverse direction or when the controlling lever is moved in alinement with the character "Back" on the scale board 61.

A plate 72 is secured to the operating shaft 8 and has three sets of teeth 73 formed thereon and each set constituting three teeth each. When the controlling lever is moved in alinement with the arrow or character pointing to the right of the scale board 61 the first three teeth or the first set of teeth of the plate 72 actuate the bell clapper 68 three times which sounds the bell 62 a corresponding number of times. When the controlling lever is moved in alinement with the arrow pointing to the left two sets of teeth 73 of the plate 72 engage the bell clapper 68 and actuate the same six times which sounds the bell 62 the same number of times. When the operating lever is moved in alinement with the character "Around," all three sets of teeth 73 of the plate 72 will actuate the bell clapper 68 nine times rendering a corresponding number of sounds from the bell 62. Owing to the teeth engaging element 69 being hinged to the bell clappers 67 and 68 will permit the plates 70 and 72 to return to their initial positions when the controlling lever is returned to neutral position without actuating the bell clapper and sounding of the bell 62. The casing 1 adjacent the bell 62 is provided with an opening surrounded by a horn 74 to magnify the sounds from the bell, thus permitting the traffic to readily distinguish the number of times the bell sounds thus warning the traffic and indicating the different signals if the traffic is so positioned as not to be able to read the characters appearing in the front and rear sight openings of the casing 1.

The bottom portion of the casing 1 is provided with an opening 75 surrounded by a boss 76 to permit dirt and other foreign matter to escape from the casing. The casing 1 adjacent the front and rear sight openings is provided with wipers 77' constructed from felt or any other material suitable for the purpose and are adapted to contact with the drum 9 for the purpose of removing dirt and other foreign matter that may adhere thereto.

To apply my invention to a closed automobile as illustrated in Fig. 21, a supporting bracket 78 is provided which consists of a pair of adjustable legs 79 formed integrally with a base 80 which rests upon the running board 81 of the automobile 77. The base 80 has hinged thereto a clamp 82 which is adapted to be swung under the running board 81 and receive bolts 83 carried by the base 80 and extending through said running board 81. The adjustable legs 79 have formed integrally with their upper ends an arcuate shaped frame 84 in which is seated the casing 1. The casing 1 is secured to the frame 84 in any desired manner.

An arm 85 is formed upon the frame 84 and rotatably supports the inner end of the operating shaft 8 which in this instance only projects a slight distance beyond the closed end of the casing 1 and has secured thereto a sprocket wheel 86 over which travels a sprocket chain 87. A shaft 88 is journaled to the under face of the automobile and has secured thereto a sprocket wheel 89 over which runs the sprocket chain 87. A casing 90 incloses the sprocket wheels 85 and 89 and the sprocket chains 87. A hanger 91 is secured to the bottom of the automobile 77 and rotatably supports the inner end of the shaft 88 and to which is secured a sprocket wheel 92. A casing 93 is carried by the hanger 91 and incloses the sprocket wheel 92. A sprocket chain 94 passes over the sprocket wheel 92 and upwardly through the bottom of the automobile and over a sprocket wheel 95 secured to a shaft 96. The shaft 96 extends transversely of the automobile and is journaled thereto in any well known manner and has connected thereto the operating means 97 which was heretofore described in connection with my preferred form of invention so that on operating the same, the drum in the casing 1 will be actuated through the sprocket chain 94, shaft 88, and sprocket chain 87.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A direction indicator comprising a casing, a transparent drum journaled in said casing, said casing having a sight opening, characters applied to the periphery of said drum, means illuminating said drum, an auxiliary casing carried by the first named casing and having communication with the interior thereof, transparent slides having characters thereon carried by the auxiliary casing and illuminated by said illuminating means, and doors hinged to the auxiliary casing for concealing the characters thereof when desired.

2. A direction indicator comprising a casing having a sight opening, a transparent drum journaled in said casing and having characters thereon, an auxiliary casing carried by the first named casing and having communication with the interior thereof, characters carried by said auxiliary casing, illuminating means for said drum and adapted to illuminate the characters of the auxiliary casing, doors hinged to the auxiliary casing for concealing the characters thereof, and a horizontal hood carried by the first named casing to protect the sight opening thereof and to support the doors when in an open position.

3. A direction indicator comprising a casing having a sight opening, a transparent drum journaled in said casing and bearing characters and having one end open, a bracket secured within one end of said casing and extending inwardly and upwardly within said drum by way of the open end thereof, and illuminating means carried by said bracket and located in the drum and spaced therefrom.

4. A direction indicator comprising a tubular casing having one end closed, a bearing carried by the closed end of said casing, a hinged door closing the other end of said casing, said casing having a sight opening, a transparent drum journaled in said casing and bearing characters, an operating shaft secured to one end of the drum and extending through said bearing, operating means for said shaft, a lamp bracket secured within said casing and extending upwardly and inwardly to a point midway of the ends of said drum, and illuminating means carried by said bracket.

5. A direction indicator comprising a tubular casing having one end closed, a transparent drum journaled in said casing and bearing characters and having one end open, a door closing the other end of said casing, said casing having a sight opening, a hollow bracket secured within said casing and extending upwardly and inwardly within the open end of said drum, illuminating means carried by said bracket, conductors for said illuminating means and extending through the hollow bracket, and a tube secured to the casing and communicating with the hollow bracket to receive the conductors.

6. An automobile signal comprising a casing having a sight opening, a transparent drum in said casing and bearing characters, a flange formed on one end of said drum and having indentations with converging walls, an operating shaft journaled in said casing and extending through said flange, an outer clamping plate secured to said drum and having spaced lugs received by the indentations of the drum, and an inner clamping plate secured to the shaft and bearing against said flange and having slots to receive the indentations.

7. A direction indicator comprising a casing having a sight opening, a drum journaled in said casing and having characters thereon, an inwardly directed flange formed on the drum and having indentations provided with converging walls, an operating shaft journaled in said casing, an outer clamping plate carried by the operating shaft and having wedge-shaped lugs formed thereon and adapted to extend in said indentations, an annular portion formed on said clamping plate and adapted to engage the inner edge of the flange, an inner clamping plate secured to the shaft and having arcuate shaped portions engaging the inner face of the flanges and defining slots to receive the indentations.

8. A direction indicator comprising a casing having a sight opening, a drum in said casing and carrying characters, an operating shaft journaled in said casing, an inwardly directed flange formed on one end of said drum and having indentations, an outer clamping plate secured to the operating shaft, an annular portion formed on said clamping plate and engaging the inner edges of said flange, wedge-shaped lugs formed on said plate and extending in the indentations, an inner clamping plate secured to said shaft and having arcuate shaped portions to engage the flange and having their ends inclined and relatively spaced to define wedge-shaped slots to receive the indentations, and packing between the plates and the flange.

In testimony whereof I affix my signature in presence of two witnesses.

PAUL M. FLACK.

Witnesses:
JOHN M. BARR,
MILTON PIERCY.